US012586282B2

(12) United States Patent
Peshkov et al.

(10) Patent No.: US 12,586,282 B2
(45) Date of Patent: Mar. 24, 2026

(54) AVATAR COMMUNICATION

(71) Applicants: Evgeny Peshkov, Yerevan (AM); Cory Grenier, Marina Del Rey, CA (US)

(72) Inventors: Evgeny Peshkov, Yerevan (AM); Cory Grenier, Marina Del Rey, CA (US)

( * ) Notice: Subject to any disclaimer, the term of this patent is extended or adjusted under 35 U.S.C. 154(b) by 28 days.

(21) Appl. No.: 18/348,911

(22) Filed: Jul. 7, 2023

(65) Prior Publication Data

US 2024/0135619 A1 Apr. 25, 2024
US 2024/0233232 A9 Jul. 11, 2024

Related U.S. Application Data

(60) Provisional application No. 63/380,814, filed on Oct. 25, 2022.

(51) Int. Cl.

| | |
|---|---|
| ***G06T 13/40*** | (2011.01) |
| ***G06T 13/20*** | (2011.01) |
| ***G06V 40/16*** | (2022.01) |
| ***H04L 51/02*** | (2022.01) |

(52) U.S. Cl.
CPC ............ *G06T 13/40* (2013.01); *G06T 13/205* (2013.01); *G06V 40/168* (2022.01); *H04L 51/02* (2013.01)

(58) Field of Classification Search
CPC ..... G06T 13/40; G06T 13/205; G06V 40/168; G06V 40/175; H04L 51/02
See application file for complete search history.

(56) References Cited

U.S. PATENT DOCUMENTS 10,198,845 B1 * 2/2019 Bhat .................... G06V 40/176
2005/0264647 A1 * 12/2005 Rzeszewski ........... H04N 7/147 348/14.02
2014/0055554 A1 * 2/2014 Du ....................... G06V 40/175 348/14.07
2023/0230303 A1 * 7/2023 Yang ........................ G06N 3/02 345/419
2024/0098130 A1 * 3/2024 He .......................... H04L 65/70

* cited by examiner

*Primary Examiner* — King Y Poon
*Assistant Examiner* — Vincent Peren
(74) *Attorney, Agent, or Firm* — Finnegan, Henderson, Farabow, Garrett & Dunner, LLP

(57) ABSTRACT

An avatar communication system can enable display on a local user device of an avatar image corresponding to a remote user. The avatar image can be generated using an avatar model and expression data. The expression data can be extracted from image data of the remote user acquired by a remote device. The local user device can be configured to display or provide communication data received from the remote device, together with the avatar image. The image data used to generate the avatar image can be obtained contemporaneously with the communication data or may be associated with the communication data. The expression data and the communication data can be obtained through the same channel, or through separate channels. The local user device can generate expression data of the local user and provide the expression data to the remote device, together with communication data of the local user.

19 Claims, 7 Drawing Sheets

300

400

ESTABLISHING A COMMUNICATION CHANNEL WITH A REMOTE SYSTEM — 402

RECEIVING FIRST COMMUNICATION DATA THROUGH THE COMMUNICATION CHANNEL — 404

RECEIVING FIRST AVATAR EXPRESSION DATA CORRESPONDING TO THE RECEIVED FIRST COMMUNICATION DATA — 406

OBTAINING A FIRST AVATAR MODEL ASSOCIATED WITH THE REMOTE SYSTEM — 408

GENERATING AN AVATAR IMAGE USING THE FIRST AVATAR EXPRESSION DATA AND THE FIRST AVATAR MODEL — 410

DISPLAYING THE AVATAR IMAGE AND PROVIDING THE FIRST COMMUNICATION DATA TO A USER OF THE AVATAR COMMUNICATION SYSTEM — 412

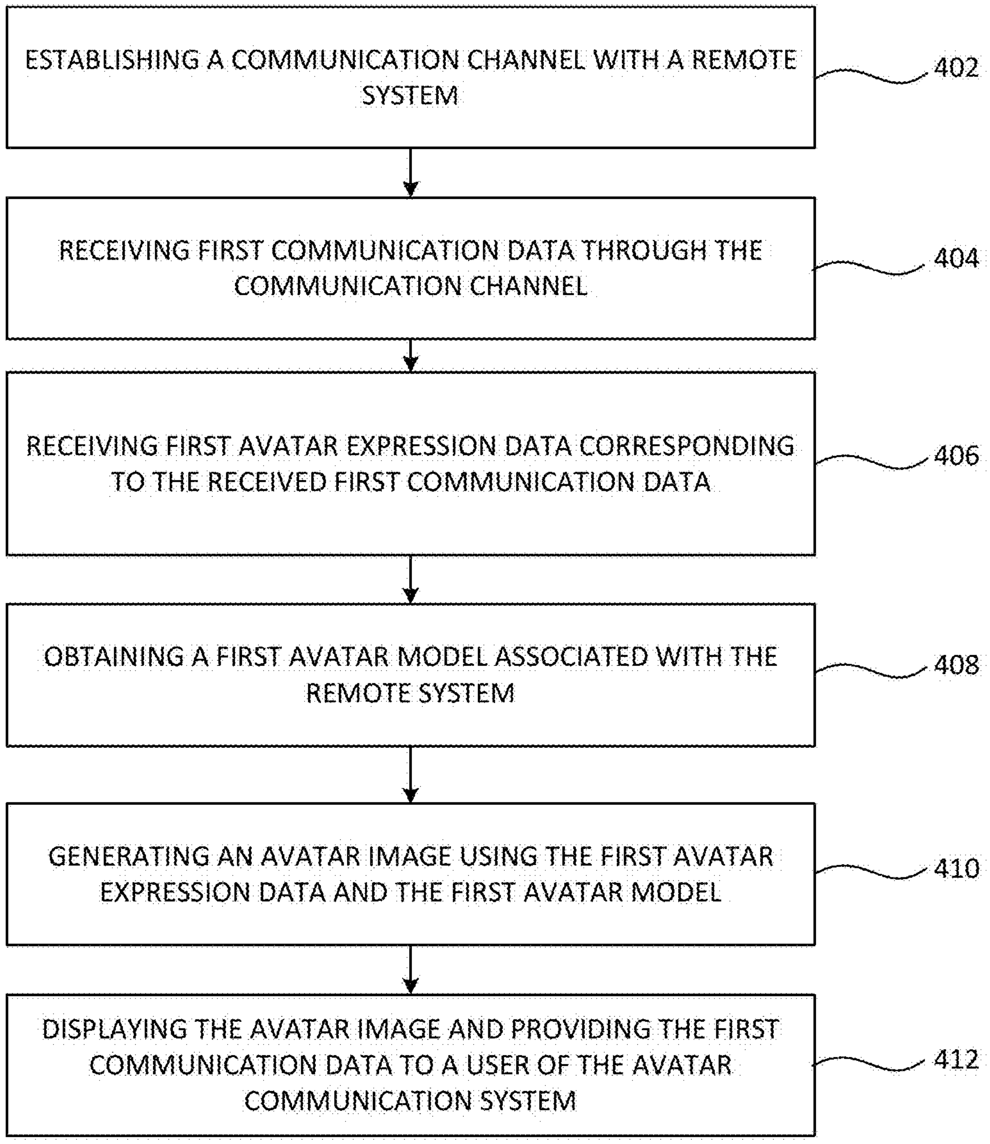

PROVIDING INSTRUCTIONS TO THE REMOTE SYSTEM, THE INSTRUCTIONS SPECIFYING A SECOND AVATAR MODEL ASSOCIATED WITH THE USER OF THE SYSTEM ⟋502

PROVIDING SECOND COMMUNICATION DATA TO THE REMOTE SYSTEM ⟋504

OBTAINING SECOND EXPRESSION DATA OF THE USER CORRESPONDING TO THE SECOND COMMUNICATION DATA ⟋506

PROVIDING THE SECOND EXPRESSION DATA TO THE REMOTE SYSTEM ⟋508

AVATAR COMMUNICATION

CROSS-REFERENCE TO RELATED APPLICATIONS

This application claims the benefit of U.S. Provisional Application No. 63/380,814, filed Oct. 25, 2022. This application is incorporated herein by reference in its entirety.

TECHNICAL FIELD

The present disclosure relates to augmented reality communication. More particularly, the present disclosure relates to audio or textual communication using avatar images to represent parties to the communication.

BACKGROUND

Real-time video communication can provide a more engaging and meaningful experience than purely audio or textual communication. However, real-time video data can require substantial bandwidth, which can make such communication impractical, particularly when many participants are involved. Furthermore, some participants may be more comfortable participating in such communications through a persona. In addition, certain applications, such as interactions with automated systems, can be difficult to implement using real-time video communications.

SUMMARY OF THE DISCLOSURE

The disclosed embodiments concern avatar communication. The avatar communication can be multi-modal, including both avatar images that represent users and audio of textual communication provided by the users. The avatar images that represent the users can be generated using avatar models and expression data. The expression data can be obtained from image data of the users during the avatar communication session, while the avatar models can be obtained prior to or during avatar communication.

The disclosed embodiments include an avatar communication system. The avatar communication system can include at least one processor and at least one non-transitory, computer-readable medium containing instructions. When executed by the at least one processor, the instructions can cause the avatar communication system to perform operations. The operations can include establishing a communication channel with a remote system. The operations can further include receiving first communication data through the communication channel from the remote system. The operations can further include receiving first expression data from the remote system, the first expression data corresponding to the received first communication data. The operations can further include obtaining a first avatar model associated with the remote system. The operations can further include generating an avatar image using the first expression data and the first avatar model. The operations can further include displaying the avatar image and providing the first communication data to a user of the avatar communication system.

The disclosed embodiments include a server. The server can include at least one processor and at least one non-transitory, computer-readable medium containing instructions. When executed by the at least one processor, the instructions can cause the server to perform operations. The operations can include receiving, from a first device of a first user, second instructions specifying an avatar model for the first user. The operations can further include receiving expression data for the first user from the first device of the first user. The expression data can be generated by the game device from an image of the first user. The operations can further include generating an avatar image representing the first user using the avatar model and the expression data. The operations can further include receiving communication data for the user from the first device of the first user. The communication data can correspond to the expression data. The operations can further include providing third instructions to display the avatar image and provide the communication data to second devices of second users.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 2C depicts another exemplary graphical user interface suitable for textual avatar communications, consistent with disclosed embodiments.

FIG. 4 illustrates an exemplary flowchart of a process for avatar communication, consistent with disclosed embodiments.

DETAILED DESCRIPTION

Figure 1:
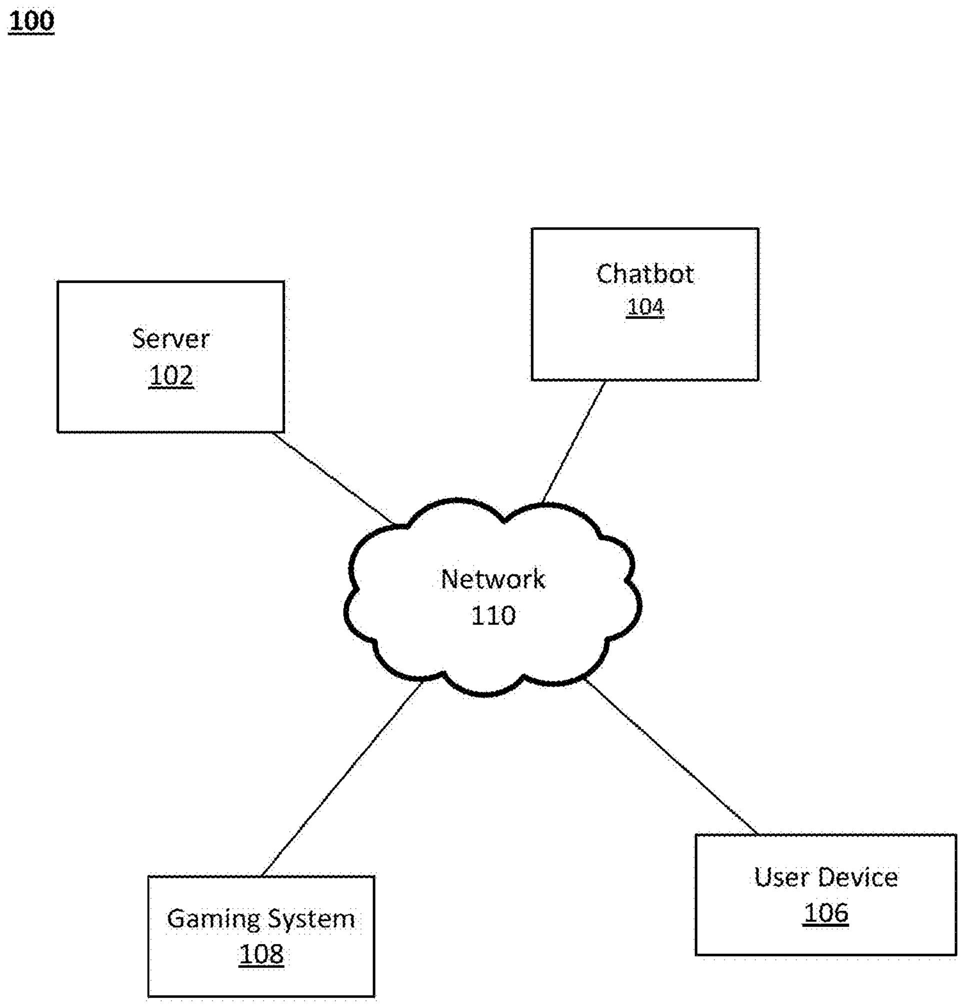
FIG. 1 depicts an exemplary system for avatar communication, consistent with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

A communication system that supports a greater degree of personalization can provide an improved user experience. For example, smartphone users appreciate the ability to customize interactions using image filters and similar personalization tools. In addition, multimodal communication (e.g., communication that involves image or video data in addition to audio or textual data) can provide a more engaging and immersive experience than unimodal communication (e.g., purely textual or audio communication). For example, users often prefer video calls or video conferencing to purely audio (or textual) communications.

However, multimodal communication can be very resource intensive. Real-time video communication can require multiple megabytes per second bandwidth, an order of magnitude more than required for audio-only communication. Particularly when managing communications among numerous participants (e.g., in a chatroom or massively multi-player video game), the bandwidth and associated processing requirements for real-time video communication can be impractical.

Furthermore, some users may prefer communication through a persona or virtual identity to communication using real-time video. In addition, in some applications, such as applications involving a chatbot or AI assistant, suitable real-time video may be impossible to obtain (or difficult to simulate).

The disclosed avatar communication systems and methods provide technical solutions to the above-mentioned technical problems. Consistent with the disclosed embodiments, an avatar communication system can be configured to use avatar models and expression data to enable personalized, multimodal communication, without the resource requirements of real-time video communication. In some embodiments, users can create, select, or customize the avatar model or models used to represent them during avatar communication. In this manner, the disclosed avatar communication systems and methods can benefit users that prefer to communicate through personas or virtual identities. Furthermore, the disclosed avatar communication systems and methods can improve communication between machines (e.g., a chatbot or AI assistant) and human users. A machine can use an avatar model and expression data to more effectively simulate a human. Conversely, expression data provided by a human user can be considered by the machine (e.g., in addition to any textual or audio communication provided by the person). The machine can use this additional data to address the needs of the person more effectively.

An avatar model can include data or instructions that, when combined with expression data, can be used to generate an image (or sequence of images, such a video or animation) that represents a user and displays the expression (or an approximation thereof) of the user.

In some embodiments, an avatar model can be implemented using morph target animation. In such embodiments, the avatar model can include a reference model and morph targets. The reference model can be a polygon mesh that describes a 3-D model, such as the face (and optionally the body) of an avatar. The morph targets can describe deformations of the reference model (e.g., changes to the positions of one or more vertices in the 3-D model). In some instances, a morph target can correspond to an expression. For example, a morph target can correspond to a smile, a frown, a furrowed brow, closed eyes, a stuck-out tongue, or the like. The avatar model can include a set of such morph targets corresponding to multiple different expressions. For example, the avatar model can include 5, 10, 50, 100, or more such morph targets. In such embodiments, expression data can be usable to generate morph weights for combining or interpolating between ones of the morph targets. For example, given a m by 1 reference model vector r, an m by n matrix of morph targets $T=[t_1 \ldots t_n]$, and an n by 1 vector of expression data e, the vertices of the resulting 3-D avatar x can be:

$$x=r+Te$$

A 2-D version of the 3-D avatar x can then be created for display by a computing device. As may be appreciated, this particular implementation of morph target animation is not intended to be limiting.

In some embodiments, an avatar model can be implemented using skeletal animation (also referred to herein as rigging). In such embodiments, an avatar model can include a surface representation (e.g., a mesh or skin), a hierarchical set of parts (e.g., a skeleton or rig), and controls configurable to manipulate the positions or orientations of the parts. In some embodiments, the locations of the vertices defining the surface representation can depend on the positions or orientations of one or more parts. Manipulating the parts can therefor affect the position of the vertices that define the surface representation. In some embodiments, relative positions or orientations of parts can be specified in terms of a kinematic chain (e.g., joint angles and links, or an equivalent representation). In such embodiments, sets of rig coordinates can correspond to expressions. For example, an avatar model of a face may include part controls specifying the tops and bottoms of the eyelids, the orientation of the eyes, the top and bottom of the lips, the position of the jaw, and head rotation and tilt controls. A set of rig coordinates can include a set of angles and/or link distances associated with these controls. The angles and/or link distances can correspond to a smile, a frown, pursed lips, closed eyes, squinting, or other expressions. In such embodiments, expression data can be usable to generate a set of rig coordinates corresponding to an expression (e.g., a smile, or another suitable expression) or a combination or expressions (e.g., a frown combined with a squint, or another suitable combination of expressions).

In some embodiments, morph targets can be generated using a rig. For example, an avatar model can be constructed by generating a rigged model and then configuring the rigged model into different expressions. The resulting surface representations can become the morph targets corresponding to the expressions. The avatar model can then generate avatar images using these morph targets and expression data.

In some embodiments, an avatar model can be defined with respect to a particular frame of reference. The expression data can include position, scale, and orientation information. The position, scale, and orientation information may enable a user device to map from the frame of reference of the avatar model to the frame of reference of the remote user. For example, the remote user may be deliberately holding a camera phone upside down. The orientation information provided in the expression data can indicate that the remote user appears upside down. The user device displaying the avatar of the remote user can use this orientation information to display the avatar of the remote user upside down. Similarly, scale or position information can be used to depict the relative position of the remote user with regards to the imaging device of the remote user. For example, when the remote user moves closer to the imaging device, a size of the avatar of the remote user can increase.

As may be appreciated, the size of an avatar model may vary depending on the complexity for the model (e.g., whether the model is 2-D or 3-D, the number of vertices in the model, any surface textures or lighting effects used by the model, or other similar model parameters). However, even when an avatar model requires an amount of data comparable to multiple seconds of real-time video, the expression data required to animate the avatar model (and therefore the bandwidth required to animate the avatar model) can be substantially smaller than the bandwidth required for real-time video. Once the avatar model is obtained by a user device, the avatar model can be used to generate images without requiring the bandwidth of real-time video.

In some embodiments, multiple avatar models can be associated with a user. These avatar models can have different sizes. For example, a sequence of avatar models can have progressively greater polygon counts, higher resolutions, or the like. During an avatar communication session, a user device can receive successively larger avatar models. For example, an initial model can be transmitted to the user device at the beginning of the avatar communication session. The initial model can be sized such that it can be received by the user device within a first duration (e.g., less than a second, a few seconds, or more) of the initiation of the avatar communication session. Once the user device has received the initial model, the user device can create avatar images using that initial model. A second model can then be transmitted to the user device (e.g., either according to a schedule, or in response to a determination or indication that the user device has received the first model, or the like). The second model can be a larger model than the initial model (e.g., the second model can include more polygons than the initial model). The second model can be sized such that it can be received by the user within a second duration greater than the first duration (e.g., a few seconds, a minute, or more). Once the second model is completely received, the user device can begin creating avatar images using the second model. In such embodiments, from a perspective of a user, a low-resolution or low-polygon-count avatar image may appear on a display of the user device shortly after initiation of the avatar communication session. The resolution or polygon count of the avatar image may then improve as the avatar communication session continues.

In some embodiments, rather than a succession of progressively larger avatar models, the user device can be configured to use a default avatar until the user device obtains an avatar model for the remote user.

In some embodiments, avatar models obtained by a user device can be stored locally in a storage location, database, memory, or cache accessible to the user device. When the user device receives a request to initiate an avatar communication session with a remote user, the user device can determine whether the storage location, database, memory, or cache includes an avatar model for the remote user. If so, that avatar model may be used for the avatar communication session.

Consistent with disclosed embodiments, expression data can be extracted from received or acquired image data of a user. In various embodiments, expression data can describe a facial expression, a pose, distance and orientation with respect to an imaging device, or the like. The expression data can be provided to another system. This other system can use the expression data and an avatar model to create a corresponding avatar image (or images). The avatar model can create the image using morph target animation, skeletal rigging, or another suitable animation method. A computing device, such as the user device and gaming devices described herein, can be configured to extract the expression data.

In some embodiments, a computing device can generate a mesh (e.g., a facial mesh) from received or acquired image data of a user. The computing device can then extract the expression data from the mesh. In some embodiments, a computing device can generate a weighted combination of expressions that approximates the mesh. The expressions can include whole-face expressions (e.g., a smile or frown, or the like) or expressions particular to a region of the face (e.g., the location of the right corner of the mouth, the location of the left eyebrow, or the like). For example, given a reference expression r and an m by n matrix of expressions $E=[e_1 \ldots e_n]$, and an n by 1 vector of expression data d, the vertices of the resulting combination of expressions x can be:

$$x=r+Ed$$

In some embodiments, the computing device can generate a set of rig coordinates for use with a rigged model. For example, the computing device can estimate a set of joint angles that, when used with the rigged model, generates an approximation of the face mesh. In some embodiments, the approximation generated using the set of joint angles can be decomposed into a weighted combination of expressions. The weights can then be the expression data.

In some embodiments, the computing device can be configured to apply the received or acquired image data to a machine learning model trained to extract expression data from image data. For example, the machine learning model can be trained using a training data set including training samples. Each training sample can include an image of a face and a corresponding set of expression data. In some instances, at least a portion of the training samples can be real-world images of faces. The corresponding sets of expression data may have been extracted from such images using known methods. In some embodiments, at least a portion of the training samples can be synthetic data. For example, 3-D models of faces can be modified using expression data and then converted to 2-D images. The resulting 2-D images can be paired with the expression data used to generate these images to create training samples.

In some embodiments, the expression data extracted by the computing system can be independent of the avatar model used by the remote system. In such embodiments, expression data can have a standardized format. For example, the computing system can extract weights for a standardized set of expressions. Avatar models can include a mapping from the standardized format used by the expression data to the format used internally by the avatar model.

Avatar models configured to use morph target animation can include a mapping from expression weights to the morph weights, consistent with disclosed embodiments. The mapping can be a function from m weights in the expression data (e.g., corresponding to m expressions) to n weights in the avatar model (e.g., corresponding to n morph targets). For example, the function can be an m by n matrix and the n weights can be generated by multiplying the expression data by the matrix. For example, the expression data may include 60 expression weights corresponding to expressions, while the avatar model may only support 10 morph weights corresponding to morph targets. A vector including the 60 expression weights can be multiplied by a 60 by 10 matrix to yield the 10 morph weights. In this example, some of the morph weights may be linear combinations of expression weights, while others may equal a single expression weight.

Avatar models configured to use skeletal rig animation can include a mapping from expression weights to joint angles or part positions of the rig, consistent with disclosed embodiments. The mapping can be a function from m weights in the expression data (e.g., corresponding to m expressions) to a set of n rig coordinates.

In some embodiments, the expression data extracted by the computing device can depend on the avatar model used by the remote system. When communicating with a first remote system using a first avatar model, the computing device may extract first expression data useable by the first avatar model. When communicating with a second remote system using a second avatar model, the computing device may extract second expression data useable by the second avatar model. In some instances, the second expression data may not be useable by the first avatar model. In such embodiments, the computing device may be configured to extract expression data based on the avatar model used by the remote system. In some embodiments, the computing device and the remote system can exchange information regarding the avatar model being used (or the expression data required). The computing device and the remote system can exchange this information directly or can exchange this information using or through an intermediary system. For example, a facial avatar model may use skeletal rigging, but may only include a subset of the parts typically used in rigging a facial model. In this example, the expression data may be usable to generate a configuration of the subset of parts used by the facial avatar model. As an additional example, the facial avatar model may include different parts than are used for a typical human facial model. In this additional example, the expression data may be usable to generate a configuration of these non-human parts.

As may be appreciated, real-time transmission of expression data can require less bandwidth than real-time transmission of video data. The avatar communication described herein can therefore be used in applications in which real-time video communication is impossible or impractical. Furthermore, consistent with disclosed embodiments, a user can provide or indicate an avatar model. That avatar model can then be used to represent them in the avatar communication system. In this manner, the disclosed embodiments can provide users a desirable degree of customization or personalization.

FIG. 1 depicts an exemplary system 100 for avatar communication, consistent with disclosed embodiments. In some embodiments, system 100 can include network 110, intermediary system 102, automatic response system 104, user device 106, and gaming system 108. Consistent with disclosed embodiments, components of system 100 can interact to establish communication channel(s) capable of support avatar communication. User(s) associated with user device 106 or gaming system 108 can then interact through these communication channel(s).

Network 110 can be configured to enable communication among components of system 100 (e.g., intermediary system 102, automatic response system 104, user device 106 and gaming system 108). Network 110 can be or include a wireless communication network (e.g., a cellular network, a WIFI network, a ZIGBEE network, a BLUETOOTH network, or the like), a wired communication network (e.g., a POTS telephone network, an optical network, or the like), or a combination of wired and wireless networks. The disclosed embodiments are not limited to any particular physical or logical implementation of network 110, or any particular communication protocol (or communication protocol(s)) for network 110.

Consistent with disclosed embodiments, intermediary system 102 can be configured to support avatar communication between components of system 100. In some embodiments, intermediary system 102 can act as an intermediary between the communicating components of system 100. Intermediary system 102 can be configured to establish a first communication channel with a first user device (e.g., user device 106) and a second communication channel with a second user device. The first user device can then communicate with the second user device through the first and second communication channels. Alternatively, or additionally, intermediary system 102 can be configured to provide information to a first user device that enables the first user device to establish a communication channel directly with the second user device. Intermediary system 102 can provide this information to the first user device in response to a request from the first user device to contact the second user device.

Consistent with disclosed embodiments, intermediary system 102 can be configured to provide avatar models to other components of system 100. For example, in response to a request from a first user device (e.g., user device 106) to communicate with a second user device, intermediary system 102 can provide an avatar model associated with the second user device (e.g., an avatar model of a second user associated with the second user device) to the first user device. Similarly, intermediary system 102 can provide an avatar model associated with the first user device (e.g., an avatar model of a first user associated with the first user device) to the second user device. In some embodiments, intermediary system 102 can be configured to obtain the avatar model from another system, such as an avatar model repository. For example, intermediary system 102 can be configured to provide identifiers for the first and second users to the avatar model repository and receive corresponding avatar models for the first and second users in response. Such an arrangement can enable system 100 to use independent repositories of avatar models. In some embodiments, intermediary system 102 can be, include, or interact with a virtual conferencing system, which can be configured to enable virtual conferencing between users using avatars.

In some embodiments, intermediary system 102 can provide information enabling a user device to obtain a suitable avatar model. For example, intermediary system 102 can provide an identifier, an address, or a resource locator for the suitable avatar model. The user device can then obtain the suitable avatar using the identifier, an address, or a resource locator. As a further example, a first user device can provide a request to connect to a second user device. In response, intermediary system 102 can provide a URL for an avatar model repository or database and an identifier for an avatar model associated with the second user device. The first user device can then contact the avatar model repository, provide the identifier, and retrieve the avatar model.

In some embodiments, intermediary system 102 can be configured to obtain avatar models. Intermediary system 102 can be configured to receive or retrieve avatar models from another computing device (e.g., user device 106, or another suitable component of system 100). Intermediary system 102 can be configured to store the avatar models (e.g., in an avatar model database maintained by intermediary system 102, or the like) or provide them to a separate storage system (e.g., a separate avatar model database). In some embodiments, intermediary system 102 can be configured to provide a user interface that enables a user to create or modify an avatar model. For example, intermediary system 102 can support an avatar editor (which may provide functionality tailored to editing, constructing, or building avatars) or an augmented reality design platform (e.g., a low-code or no-code augmented reality design platform). A user can interact with the avatar editor or augmented reality design platform to create an avatar model (e.g., using components available within the editor or platform, components uploaded to the editor or platform, such as image files or 3D or augmented reality object files, or some combination thereof). In some embodiments, the avatar editor or augmented reality design platform can be accessible through a web browser.

In some embodiments, intermediary system 102 can be configured to register an avatar model for use in system 100. Registration of an avatar model can include associating the avatar model with a user (or a device of a user). In some embodiments, the user can have an account with intermediary system 102. In such embodiments, registration of an avatar model can include associating the avatar model with the account of the user. For example, an account can include instructions or data linking the avatar model to the account. As an additional example, an avatar model can be stored at a memory location associated with an account. In some embodiments, intermediary system 102 can be configured to use the avatar model for all attempts to communicate with the user. In various embodiments, intermediary system 102 can be configured to allow the user to implement rules or conditions governing which of multiple avatar models used to generate images displayed to other users communicating with the user. For example, a user can interact with intermediary system 102 (e.g., through a graphical user interface provided by intermediary system 102) to create an avatar model of a sad clown. The user can associate the sad clown avatar model with a list of friends and family members. When these friends and family members communicate with the user, the intermediary system 102 can provide them with data or instructions for implementing the sad-clown avatar model. The user can also upload an avatar model provided by his employer. This avatar model can be a nondescript man in a gray flannel suit. When any other person attempts to communicate with the user, the intermediary system 102 can provide them with data or instructions for implementing the nondescript, gray-flannel-suited avatar model. As may be appreciated, the user can have many different avatar models associated with different rules or lists describing when those avatar models should be used.

Consistent with disclosed embodiments, intermediary system 102 can support integration of avatar communication into a third-party service. In some embodiments, intermediary system 102 can be configured to support integration of avatar communication into a virtual conferencing service or massively multiplayer online game. As described herein, avatar communication can be integrated into a graphical user interface of the virtual conferencing service or game (e.g., using a panel, widget, window, or another suitable integration method). In some embodiments, user interactions with the graphical user interface can result in data or instructions being indirectly provided to intermediary system 102. For example, interactions with the graphical user interface can be provided by a game server running an instance of the game to intermediary system 102 (e.g., using an application programming interface associated with intermediary system 102, or another suitable method). As an additional example, a game system (e.g., game system 108) can be configured to directly provide user interactions with the graphical user interface to intermediary system 102 (e.g., using a client the manages interactions between the game system and the game server). In some embodiments, intermediary system 102 can be configured to support integration of avatar communication into a website. For example, a company website can enable communication (e.g., using a widget, control, iframe, popup, or other suitable integration method) between a user and an employee of the company (e.g., a technician, sale representative, customer service specialist, or the like) or a chatbot. The user can interact with the website and the communications can be provided to intermediary system 102, either indirectly through a system hosting the website, or directly from the computing device of the user.

As may be appreciated, embodiments using intermediary system 102 as an intermediate server can benefit from the centralized management of avatars across multiple applications. For example, a user can use the same avatar for avatar communications in multiple different massively online games, chat programs built into social media platforms, virtual conferencing applications, and instant messaging services. This centralization can encourage the user to put additional effort into customizing the avatar or otherwise encourage user engagement.

As described herein, intermediary system 102 can be configured to establish connections between user devices (or provide data or instructions enabling the user devices to directly connect with each other). In some embodiments, such connections can be established using webRTC, Session Initiation Protocol (SIP), Real-Time Streaming Protocol (RTSP), Web Sockets, or VoIP. As may be appreciated, the disclosed embodiments are not limited to the enumerated protocols. Other suitable protocols or applications useable for video conferencing, voice calls, video calls, online gaming, or similar applications may additionally or alternatively be used.

Consistent with disclosed embodiments, automatic response system 104 can provide an endpoint for avatar communication in system 100. In some embodiments, automatic response system 104 can be configured to receive a connection request from system 100. Such a connection request can be received from intermediary system 102, or from another component of system 100 (e.g., user device 106). When the connection request is received from intermediary system 102, intermediary system 102 may have received the request indirectly (e.g., through a game server or website host), or directly (e.g., from a user device). Automatic response system 104 can be configured to accept the connection request, establishing a communication channel with a user device (e.g., user device 106, game device 104, or the like). Automatic response system 104 can be configured to receive textual or audio data through the communication channel. Automatic response system 104 can be configured to provide responsive textual or audio data (e.g., using a chatbot, a text-to-speech system, an interactive voice response system, or the like).

Consistent with disclosed embodiments, an avatar model can be associated with automatic response system 104. For example, automatic response system 104 can have an account with intermediary system 102, and an avatar model can be associated with that account. Automatic response system 104 can be configured to generate expression data and provide that expression data to the user device. As described herein, the expression data can be provided together with, or in a separate channel from, the responsive textual or audio data. Automatic response system 104 can be configured to generate the expression data based on the textual or audio data received from the user device. As an example, automatic response system 104 can be integrated into the website of an airline (e.g., as a widget, a control, a plugin, or using another suitable integration method). A customer can interact with the website to obtain or change reservation information. An avatar model of a woman's face can be registered to an account for automatic response system 104. In response to a customer attempting to make permissible changes their reservation, the automatic response system 104 could provide a confirmation message (e.g., an audio message) and expression data corresponding to a cheerful smile. The user device of the customer would generate the cheerful smile using the avatar model and the expression data. The customer would then see a cheerfully smiling woman's face accompanying the message. In response to a customer attempting to make impermissible changes their reservation, the automatic response system 104 could provide a rejection message and expression data corresponding to an apologetic frown. The user device of the customer would generate the apologetic frown using the avatar model and the expression data. The customer would then see an apologetically frowning woman's face accompanying the message.

In some embodiments, automatic response system 104 can be configured to generate expression data based on the textual or audio data received from the user device. In some embodiments, sentiment analysis can be used to identify the emotional state of the user. Simple rules (or more involved approaches such as reinforcement learning from human feedback) can be used to generate appropriate expression data to accompany a response. For example, a rule can specify that a response to an angry customer be paired with expression data specifying a conciliatory facial expression (or a neutral facial expression), as a happy facial expression may appear unnatural or enraging to the customer. As an additional example, a rule can specify that positive sentiment expressed by the customer be answered with a positive facial expression (e.g., a smile). In some embodiments, when expression data of the user is provided to automatic response system 104, sentiment analysis can be performed using this user-derived expression data. For example, an angry user may make a face indicative of her anger. A user device can extract expression data from the image of her face and provide this expression data to automatic response system 104. Automatic response system 104 can be configured use this expression data to identify that the user is angry and formulate responsive expression data.

Consistent with disclosed embodiments, user device 106 can be a wearable device (e.g., a smartwatch or the like), a mobile device (e.g., a smartphone, laptop, tablet computer, or the like), a desktop computer, workstation, or another computing device capable of acquiring image data of a user and textual or audio communication data of the user.

Consistent with disclosed embodiments, user device 106 can be configured to enable avatar communication with another component of system 100. The avatar communication can be performed over a communication channel. In some embodiments, the communication channel can be a telephony channel (e.g., a VoIP channel). In such embodiments, establishing the communication channel can include locating a server associated with a target user and exchanging session description information (e.g., in accordance with the Session Description Protocol, or another similar protocol). In some embodiments, the communication channel can be an application session. In some embodiments, a single message can be sent in the communication channel (e.g., when the message is a Short Message Service (SMS) or Multimedia Messaging Service (MMS) message, or the like). In some embodiments, multiple messages can be exchanged over the communication channel (e.g., a VoIP call, a chat window application on a website, or the like). As described herein, the communication channel can directly connect user device 106 and another, remote device. Alternatively, the communication channel can connect user device 106 to an intermediary system (e.g., intermediary system 102). Another communication channel (which may use another communication protocol) can then connect the intermediary system to the remote device.

In some embodiments, the expression data and the communication data (e.g., textual or audio data) can be provided through the communication channel. For example, the expression data can be provided as metadata associated with the communication data. In some embodiments, the communication channel can enable user device 106 to send and receive streaming audio data. The streaming audio data can be a stream of audio packets. In some embodiments, the expression data can be encoded in the audio packets (e.g., together with the audio data). For example, the packets can be configured to include control fields. The expression data can be written into the control fields and thereby transmitted with the audio data. In some embodiments, fields typically used for closed captioning can be used instead to transmit expression data.

In some embodiments, the expression data can be provided through another communication channel separate from the communication channel used to provide the communication data. For example, the expression data can be exchanged using a separate session (e.g., a separate Real-Time Transport Protocol session) from the session used to provide the communication data. As an additional example, expression data can be periodically exchanged using User Datagram Protocol datagrams or Transmission Control Protocol packets.

Consistent with disclosed embodiments, expression data can correspond to communication data provided through the communication channel. In some instances, the expression data and the communication data can be acquired contemporaneously. For example, video data of a local user speaking can be separated into expression data describing the facial movements of the local user and audio speech data. In various instances, the expression data can be associated with the communication data. For example, a local user can enter a text message (or email) and press "send" to deliver that text message (or email) to a remote user. The expression data captured can be extracted from an image of the local user acquired when the user pressed "send." Seconds or even minutes may have elapsed between when the user began composing the text message (or email) and when the user pressed "send." But the expression data is still associated with the communication data.

Consistent with disclosed embodiments, expression data and contemporaneously acquired communication data may require synchronization upon receipt. As may be appreciated, real-time extraction and transmission of expression data can ensure that the mouth movements of an animated avatar match the sounds produced by user device 106. When expression data and communication data are provided in the same communication channel, additional syncing of audio communication data with expression data may be unnecessary. When expression data and communication data are provided in separate communication channels, the expression data and the communication data may be timestamped or otherwise associated with an acquisition or transmission time, such that the expression data and communication data can be synchronized upon receipt by user device 106. In some embodiments, when the delay between expression data and communication data is less then a threshold value (e.g., 100 ms, 50 ms, 10 ms, or less), the expression can be used (or communication data provided) as it is received. Alternatively, in some embodiments such synchronization can be automatically handled by the communication channel.

Consistent with disclosed embodiments, user device 106 can be configured to establish a communication channel with a remote system. In some embodiments, establishing the communication channel can include receiving a request to communicate with the remote system. For example, the request can be a phone call. User device 106 can answer the phone call in response to an interaction with a user. As an additional example, the request can be an indication that a message is awaiting a user a messaging application. In some embodiments, establishing the communication channel and receiving the request to communicate can include receiving a message (e.g., an MMS or SMS message). In some embodiments, user device 106 can be configured to create a session to handle the communication, or the like. The request can be received from the remote system directly, or from an intermediary system.

In some embodiments, establishing the communication channel can include providing the request to communicate to the remote system. For example, when the request is a phone call, user device 106 can initiate a phone call in response to a user interaction with user device 106. As an additional example, user device 106 can provide a ping message or otherwise notify a remote device associated with a remote user on an instant messaging platform. In some embodiments, establishing the communication channel and providing the request to communicate can include providing a message (e.g., an MMS or SMS message). In some embodiments, user device 106 can be configured to create a session to handle the communication, or the like.

In some embodiments, the communication channel can be associated with a conferencing application. The conferencing application can enable creation of virtual conference rooms. Participants can join virtual conference rooms and participate in discussions. Such participation can include audio communications, chat (e.g., public chat or direct messaging between participants in the chatroom), file sharing, or the like. Consistent with disclosed embodiments, avatar models can be used to provide real-time visual representations of the users.

In some embodiments, an intermediary system (e.g., intermediary system 102, or the like) can host the virtual conference room. User devices can connect to the virtual conference room using a client application or a web browser. In some embodiments, the intermediary system can provide an invitation to potential participants. The invitation can include a control (e.g., a link or the like) selectable by a user of the user device to create a communication channel between the user device and the intermediary system. In some embodiments, the intermediary system can forward expression data received from one participant to the other participants of the virtual conference.

Consistent with disclosed embodiments, user device 106 can be configured to obtain an avatar model. In some instances, the obtained avatar model can correspond to a remote user. User device 106 can generate images that represent the remote user using the obtained avatar model and expression data for the remote user. As described herein, user device 106 can obtain the avatar model corresponding to the remote user before or during avatar communication with the remote user.

In some embodiments, user device 106 can be configured to retrieve or receive an avatar model corresponding to a remote user from an intermediary system (e.g., intermediary system 102, or the like), an avatar repository, or a remote system (e.g., the remote system with which user device 106 established a communication channel), or the like. In some instances, user device 106 can be configured to obtain an identifier for an avatar model (e.g., from the intermediary system or the remote system, or the like). User device 106 can then obtain the avatar model from a memory accessible to user device 106 (e.g., a memory of user device 106, the avatar repository, or the remote system). For example, user device 106 can store avatar models previously used for avatar communication, together with identifying information associating each avatar model with another user (or user account). When another device contacts user device 106, the other device can provide an identifier of another user. User device 106 can use the identifier to retrieve the avatar model associated with the user from memory. User device 106 may alternatively determine that the avatar model for that user is not available in memory and retrieve the avatar model from an avatar model repository using the identifier.

In some instances, the obtained avatar model can correspond to a local user associated with user device 106. In some embodiments, user device 106 can be configured to retrieve or receive an avatar model corresponding to a local user from an intermediary system (e.g., intermediary system 102, or the like), or an avatar repository, or the like. For example, user device 106 can download an avatar from a publicly accessible repository of such avatars (e.g., a commercial site that provides avatars for use with avatar communication systems). In some embodiments, user device 106 can be configured to generate the avatar model associated with the local user. For example, user device 106 can support an avatar editor (which may provide functionality tailored to editing, constructing, or building avatars) or an augmented reality design platform (e.g., a low-code or no-code augmented reality design platform). The local user can interact with the avatar editor or augmented reality design platform to create an avatar model (e.g., using components available within the platform; components downloaded to the platform from another system, such as image files or 3D or augmented reality object files; components acquired by the platform, such as images or video acquired by a camera associated with user device 106, or some combination thereof).

In some embodiments, user device 106 can be configured to provide to an intermediary system (e.g., intermediary system 102, or the like) or to a remote system (e.g., a system engaged in avatar communication with user device 106) an avatar model corresponding to a local user. In some embodiments, user device 106 can provide the avatar model in response to a request from the intermediary system or the remote system. In some embodiments, user device 106 can receive a request for an avatar model as part of establishing a communication channel with the intermediary system or the remote system. In some embodiments, user device 106 can provide the avatar model in response to the request. In various embodiments, user device 106 can provide an identifier or instructions for retrieving the avatar model in response to the request (e.g., a URL of a website or resource from which the avatar model can be retrieved, or the like).

In some embodiments, user device 106 can be configured to obtain expression data. The expression data can concern a local user engaged in avatar communication using user device 106. Obtaining expression data can include receiving or acquiring image data of the local user and extracting expression data from the acquired image data.

In some embodiments, user device 106 can be configured to receive or acquire image data of a local user. In some embodiments, the image data can be video data. In some embodiments, the image data can be at least one image of the local user. For example, the user device 106 can obtain video data of the user or a sequence of images (e.g., an image per second, per two seconds, per five seconds, or the like) of the local user. In some embodiments, user device 106 can be configured to acquire an image in response to an event (e.g., the receipt or transmission of a message). For example, an avatar communication session can include an exchange of text messages. Whenever the local user associated with user device 106 sends a text message, the user device can acquire an image of the local user.

As described herein, user device 106 can generate expression data from the received or acquired image data of the local user. The expression data may be useable for morph target animation, skeletal rigging animation, or another suitable animation method. The expression data may be acquired using a machine learning model, or may be generated by creating a 3-D mesh from the acquired image of the user and decomposing the 3-D mesh into a reference model, a set of morph target, and a set of weights corresponding to the morph targets.

Consistent with disclosed embodiments, game system 108 can be a game console, smartphone, tablet, laptop, or other computing device used to play video games. Game system 108 can include or be communicatively connected to an imaging device capable of acquiring image data image of a local user of gaming system 108. Game system 108 can include a microphone capable of acquiring speech of the local user. Game system 108 can include a display. The display can be capable of displaying a graphical user interface of a video game. The video game can display a virtual environment or an augmented reality environment. In some instances, the video game can simulate the presence of the local user in the virtual or augmented reality environment. For example, pose tracking can be used to control the actions of a character representing the user in the video game. Alternatively, the user can use traditional controls (e.g., a joystick, mouse, keyboard, video game controller, or the like) control a character representing the user.

In some embodiments, avatar communication can be integrated into the video game. In some embodiments, avatar communication can be integrated into user interface (e.g., as a widget, a chat window, or using another suitable integration method). For example, a user can be part of a team (e.g., a guild that is playing some special mission). Avatars of the team members can be presented in the user interface. In various embodiments, avatars can be integrated into the game itself. For example, a character representing a user of game system 108 can be animated using expression data of the character. The character, which can be one of a set of character models supported by the video game, can then exhibit expressions based on the expression of the user playing the game. Other players of the game would then see these expressions on the character.

In some embodiments, chatbot functionality can be integrated into the video game. For example, a chatbot can be configured to generate responses for non-player characters in response to player interactions (e.g., using a large language model to generate responsive text). Expression data can be generated to accompany the responses for the non-player characters (e.g., using sentiment analysis or rules based on the actions of the player, or another suitable method). Avatar models for the non-player characters can then be combined with the synthetic expression data to generate an avatar image that appears more lifelike, responsive to player inputs, and human.

In some embodiments, the communication channel connects to an automated voice system or chatbot running on the remote system. The avatar's expressions and body movements can also be controlled by the chat bot running on the remote system, which may use natural language processing and machine learning algorithms. These algorithms can be configured to determine expressions based on the conversation of the avatar, while also providing the opportunity to allow the chat bot to communicate emotions and moods that are associated with the avatar.

Figure 2A:
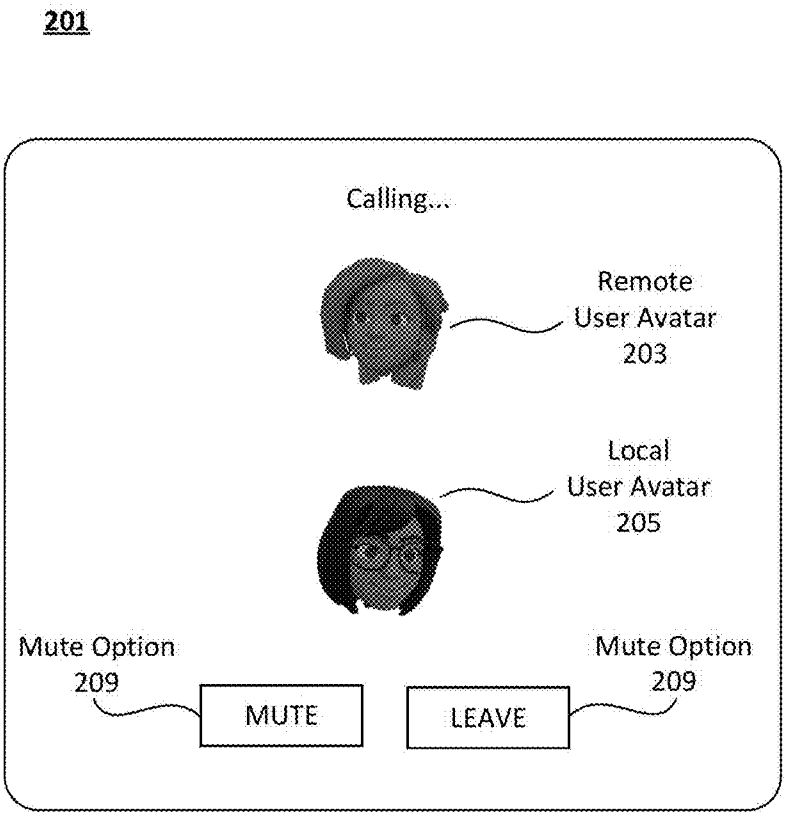
FIG. 2A depicts an exemplary graphical user interface suitable for audio avatar communication, consistent with disclosed embodiments.

FIG. 2A depicts an exemplary graphical user interface 201 suitable for audio avatar communication, consistent with disclosed embodiments. A user device (e.g., user device 106, game device 108, or the like) can be configured to depict graphical user interface 201 during avatar communication between when a local user of the user device and a remote user on a remote system.

In some embodiments, graphical user interface 201 can be configured to display indicators showing information about the communication. For example, graphical user interface 201 can display a call status indicator 211. The call status indicator can display messages associated with the avatar communication session (e.g., a "calling" message during creation of the session, the session duration during the session, error messages such as "Call Failed" or "Signal Lost", or other suitable messages).

In some embodiments, graphical user interface 201 can be configured to display controls useable to affect the avatar communication. Such controls can include a mute control 209 that is selectable to mute the audio of the remote user, or an exit control that is selectable to cause the local user to exist the avatar communication session. Additional possible controls can include a microphone control that is selectable by the local user to mute the local user. As may be appreciated, the disclosed embodiments are not limited to a particular selection or arrangement of controls and indicators on graphical user interface 201.

In some embodiments, graphical user interface 201 can be configured to display an avatar image of the local user (e.g., local user avatar 205). This avatar image can be generated using the same avatar model and same expression data as used by the remote system. This avatar image can provide immediate feedback to the local user regarding how they appear to the remote user.

Consistent with disclosed embodiments, graphical user interface 201 can be configured to display an avatar image of a remote user (e.g., remote user avatar 203). This avatar image can be generated using an avatar model for the remote user and expression data for the remote user. The expression data for the remote user can be obtained, together with communication data (e.g., audio data) from the remote system. The user device can then combine the expression data with the avatar model to generate the avatar image depicted in FIG. 2A.

As depicted in FIG. 2A, an avatar image can be 2-D, such as local user avatar 205, or 3-D, such as remote user avatar 203.

While FIG. 2A depicts communication between two users, the disclosed embodiments are not so limited. In some embodiments, an avatar communication session consistent with FIG. 2A can include three or more users. In such instances, the avatars for all remote users may be depict in graphical user interface 201. In some embodiments, the avatar associated with a currently speaking user may be highlighted using size, positioning on the graphical user interface, a graphical effect, or another suitable technique.

Figure 2B:
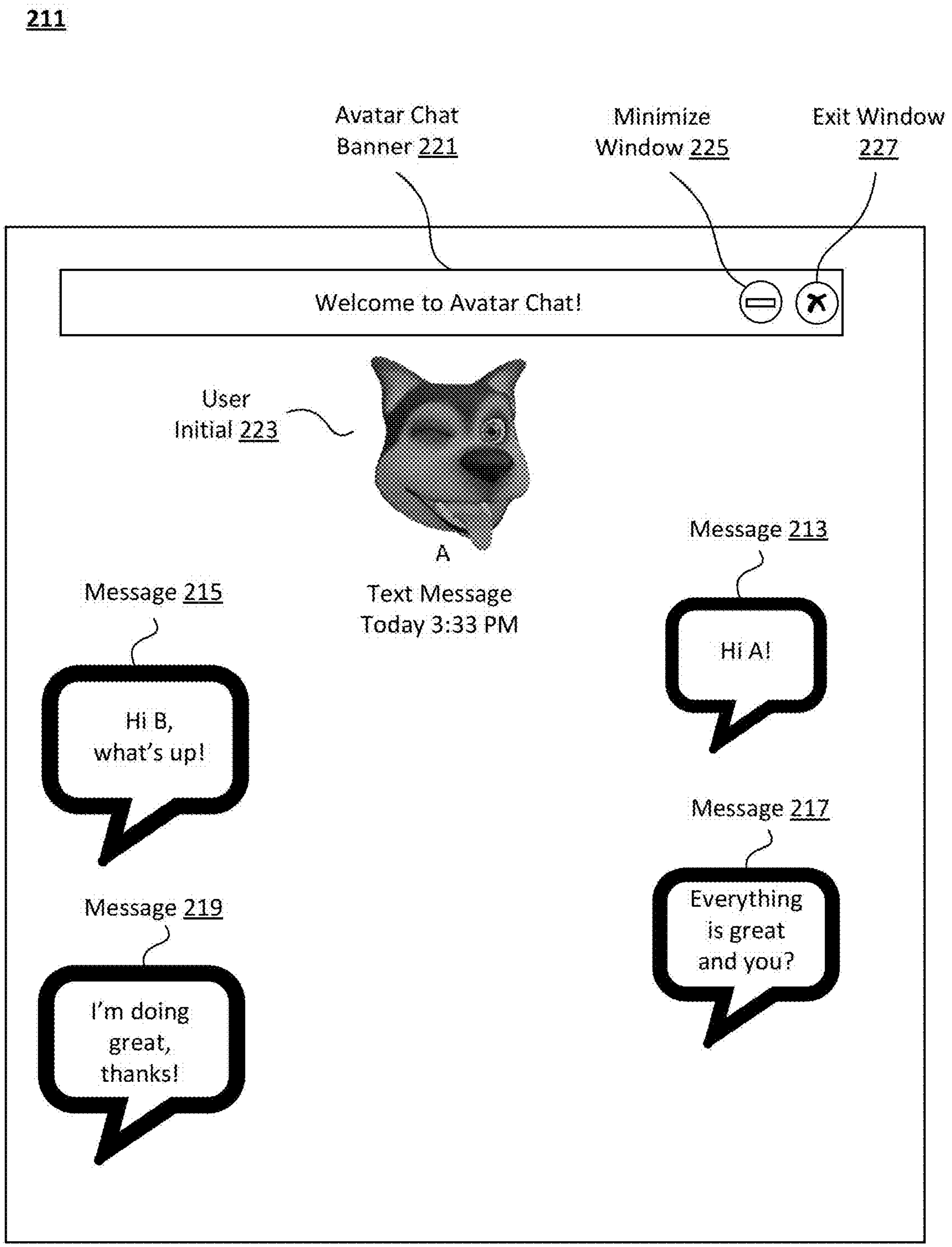
FIG. 2B depicts an exemplary graphical user interface suitable for textual avatar communications, consistent with disclosed embodiments.

FIG. 2B depicts an exemplary graphical user interface 212 suitable for textual avatar communications, consistent with disclosed embodiments. Graphical user interface 212 may include indicators, such as avatar chat banner 221, that can display information about the avatar communication session. Graphical user interface 212 may also display controls, such as minimize control 225 and exit control 227. Minimize control 225 can be selectable to minimize graphical user interface 212 (e.g., should the local user decide to use another application), while maintaining the avatar communication session. Exit control 227 can be selectable to enable the local user to quit the avatar communication session.

Consistent with disclosed embodiments, graphical user interface 212 can display messages exchanged by participants in the textual avatar communication session (e.g., message 215 and message 219, sent by the remote user, and message 213 and message 217, sent by the local user). In this example, a remote user "Adam" is communicating with a local user "Chris."

In some embodiments, graphical user interface 212 can include a remote user avatar 223. Remote user avatar 223 can display an avatar image representing the remote user. The avatar image can be generated using an avatar model of the remote user and expression data for the remote user. In some embodiments, as depicted in FIG. 2A, the user avatar can be independent of the text messages. For example, the user avatar is not associated with any particular text message. In such embodiments, the user avatar may repeatedly update as new expression data is received.

FIG. 2C depicts an exemplary graphical user interface 231 suitable for textual avatar communications, consistent with disclosed embodiments. Graphical user interface 231 may include indicators and controls, similar to graphical user interface 212. Similar to graphical user interface 212, graphical user interface 231 can display messages exchanged by a local user and a remote user.

As disclosed in FIG. 2C, in some embodiments avatar images can be associated with messages received from the remote user. For example, remote user avatar image 233A can be associated with a message received from the remote user at 3:31 PM. In some embodiments, the expression data used to generate remote user avatar image 233A can be received together with the message, or contemporaneously through another communication channel. Similarly, remote user avatar image 233B can be associated with a message received from the remote user at 3:34 PM. In some embodiments, the expression data used to generate remote user avatar image 233B can be received together with the message, or contemporaneously through another communication channel. As may be appreciated, the expression of the remote user can differ between messages. The avatar images in graphical user interface 231 can therefore become a record of the changing expressions of the remote user.

In some embodiments, in addition to remote user avatar images, graphical user interface 231 can display local user avatar images, such as local user avatar images 232A and 232B. These avatar images can be associated with messages and can be generated using expression data obtained contemporaneously with the sending of these messages.

Figure 3:
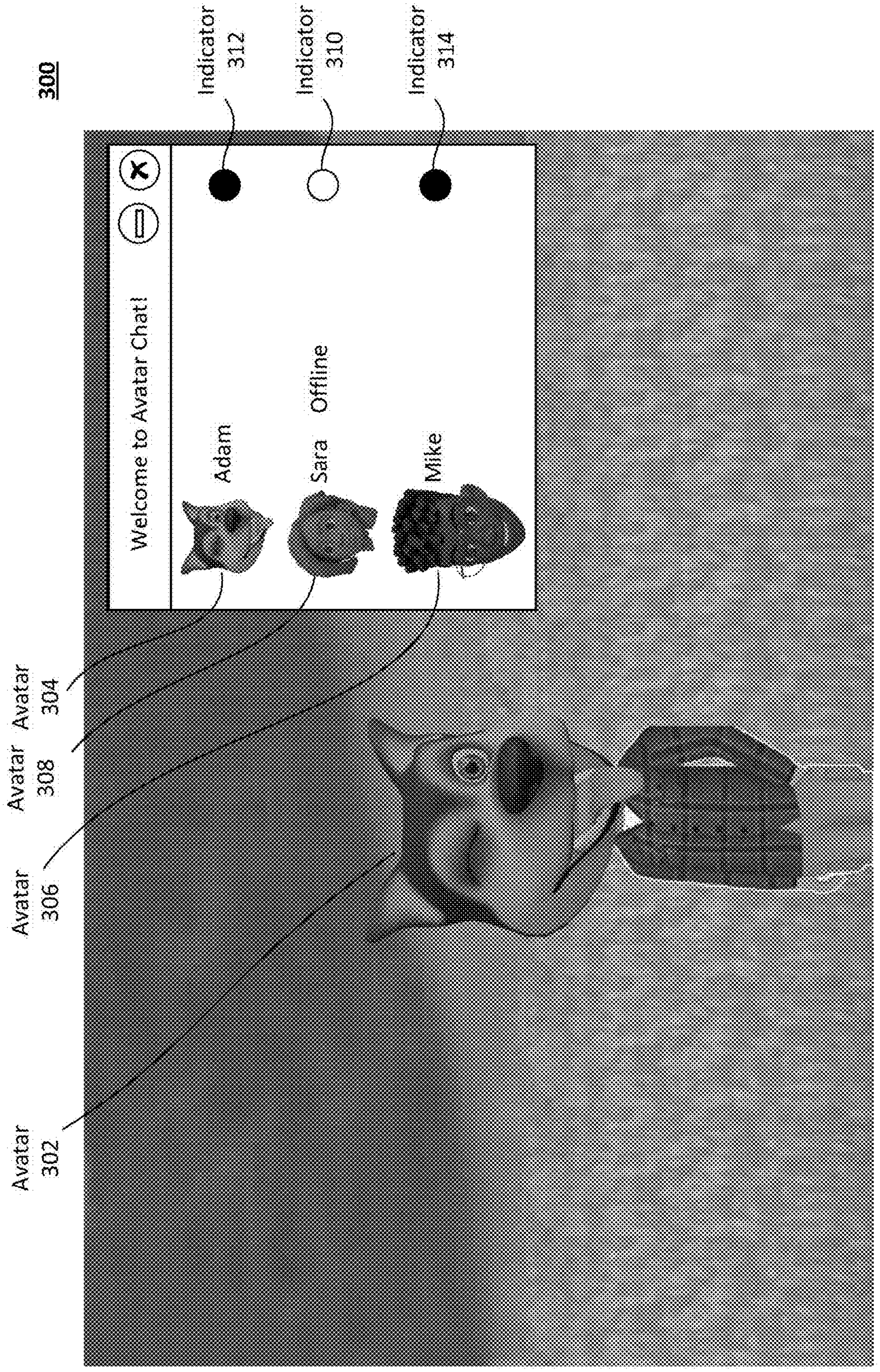
FIG. 3 depicts an exemplary graphical user interface for a user in a video game, consistent with disclosed embodiments.

FIG. 3 depicts an exemplary graphical user interface 300 for a user in a video game, consistent with disclosed embodiments. The video game can be a multiplayer video game. As depicted in FIG. 3, graphical user interface 300 can include a chat window. The chat window can include avatar images (e.g., avatar 306, 308, 304) corresponding to users of the game. In some embodiments, the chat window can include usernames and status information. For example, an indicator (e.g., indicator 312, 310, and 314) can indicate whether a user is currently active in the game. Likewise, a text message can indicate that user Sarah is inactive. In some embodiments, a user can engage in direct communications with another user that is active by selecting the avatar image of that active user.

In some embodiments using audio communication, the avatar image of a currently speaking user can be emphasized through position, size, or graphical effects. In some embodiments using textual communication, messages can be posted to the chat window. These messages can be associated with avatar images, as described above with regards to FIG. 2C.

As depicted in FIG. 3, the graphical user interface can further display a view of a virtual environment 316. An avatar image 302 of the user Adam can be displayed in the virtual environment. Other users interacting with the user Adam will see avatar image 302 in their views of the virtual environment. As described herein, avatar image 302 can be generated using the expression data extracted from image data of user Adam and an avatar model for user Adam.

While playing the multi-player game, avatar 302 may have the option to communicate with avatar 306 and avatar 308 within an avatar chat that may be displayed within the game. This may be done through a communication channel that is implemented for the multiplayer game, when the avatar image is provided by the system. The avatar image would be displayed in a GUI of the multiplayer game, which is the avatar chat. For example, avatar 304 may represent the avatar of the user playing the multi-player game in the chat.

FIG. 4 illustrates an exemplary flowchart of a process 400 for avatar communication, consistent with disclosed embodiments. In some embodiments, process 400 can be performed using system 100. For convenience of description, the process is described with regard to a user device (e.g., user device 106). However, this description is not intended to be limiting.

In step 402 of process 400, the user device can establish a communication channel with a remote system. In some embodiments, the user device can receive a request to communicate with the remote system. The request can be received from the remote system or from an intermediary system. The request can identify a remote user. In respond to the request, the user device can provide session description information (or other suitable information required to establish the communication channel). In some embodiments, the user device can provide a request to communicate. In some embodiments, the request can indicate a remote user or a remote system associated with the remote user. In some embodiments, the remote user can be an automated voice system or chatbot running on the remote system.

The user device can provide the request to the remote system or an intermediary system. As described herein, an intermediary system can be used to connect a local system with a remote system. For example, a communication channel between the user device and the remote system can be implemented using a first communication channel between the user device and the intermediary system and a second communication channel between the intermediary system and the remote device.

In step 404 of process 400, the user device can receive communication data through the communication channel from the remote system. In some embodiments, the communication channel may be a telephony channel (e.g., a VoIP session, or the like). In some embodiments, the communication data can include audio data (e.g., when the avatar communication includes a voice call) or textual data (e.g., when the avatar communication includes SMS or MMS messaging, or the like).

In step 406 of process 400, the user device can receive expression data from the remote system. The expression data can correspond to the received communication data. In some embodiments, the expression data may have been extracted from image data acquired contemporaneously with the communication data. In some embodiments, the expression data may be associated with the communication data.

In some embodiments, the expression data can be received through the same communication channel as the communication channel. For example, the communication channel can include a stream of audio packets and the expression data may be included into control fields of the audio packets. In some embodiments, the expression data can be received through a separate communication channel.

In step 408 of process 400, the avatar communication system can obtain an avatar model associated with the remote system. In some embodiments, the avatar model can be associated with a remote user of the remote system. As described herein, in some instances the avatar model can be retrieved from a memory accessible to the user device. For example, the user device may have previously obtained the avatar model before or during a prior avatar communication session with the remote user. In some instances, the user device can obtain the avatar model from an intermediary system or an avatar storage system. In some instances, the user device can obtain the avatar model from the remote device.

In some embodiments, the user device can obtain the avatar model before the establishment of the communication channel between the user device and the remote system. For example, the user device may have previously obtained the avatar model or may obtain the avatar model from the remote device, an intermediary system, or an avatar storage system prior to establishing the communication channel. As an additional example, the user device may use a default avatar model for the remote user, or may enable the local user to create an avatar model and associate the avatar model with the remote user.

In some embodiments, the user device can obtain the avatar model during the existence of the communication channel. For example, the user device can request the avatar model upon establishment of the communication channel. In various embodiments, the user device can request the avatar model from the remote device, an intermediary system, or an avatar storage system. In various embodiments, the avatar model can be provided to the user device through a separate communications channel. For example, the communications channel can be between the remote device and the user device. The user device can request the avatar model from the remote device. The remote device can provide the user device with an identifier of the avatar model. The user device can request the avatar model from an intermediary system or an avatar model storage system using the identifier. The intermediary system or avatar model storage system can provide the avatar model to the user device through a communication channel (e.g., an HTTP/HTTPS session or the like), separate from the communication channel between the remote system and the user device.

In some embodiments, as described herein, the user device can obtain a sequence of avatar models of increasing size. One or more of these models can be obtained during the existence of the communication channel.

In some embodiments, the avatar model can be installed on the user device following receipt of the avatar model. For example, the avatar model can be provided as a rigged model, together with a set of poses. Each pose can correspond to a morph target. Installation of the avatar model can include initializing the avatar model. Initializing the avatar model can include generating a set of morph targets using the provided rigged model and set of poses. In some embodiments, the user device can extract a morph target from a rigged, posed model by extracting the vertex locations of the surface representation of the rigged, posed model (or a specified portion of thereof). For example, the avatar model can be provided as a rigged model of a human face. The set of poses can include a "frown" pose including a rig configuration that causes the rigged model to assume the shape of a frown. A user device can access the rigged model, configure the rigged model into the frown pose, and extract the surface representation corresponding to the frown pose to use as a morph target. As may be appreciated, a rigged model and a set of poses can be far smaller than a set of morph targets. Distribution of rigged models and pose sets can therefore require fewer resources (e.g., time, bandwidth, data, or the like) than distribution of sets of morph targets.

In step 410 of process 400, the user device can generate an avatar image using the expression data and the avatar model. The avatar image can represent the remote user. In some embodiments, generation of the avatar image can include synchronizing the expression data with the corresponding communication data. For example, should the expression data arrive prior to the communication data, the generation of the avatar image can be suitably delayed. As described herein, the avatar image may be generated using morph target animation or rigging animation. In some embodiments (e.g., when the delay between the expression data and the communication data is less than a threshold value, such as 100 ms, 50 ms, 10 ms, or less), the generation of the avatar image can be performed as the expression data is received.

In step 412 of process 400, the avatar communication system may display the avatar image and provide the first communication data to a user of the avatar communication system. The avatar image can be displayed on a screen of the user device. Textual communication data can similarly be displayed on a screen of the user device. Audio communication data can be output using a speaker of the user device.

The disclosed embodiments are not limited to the particular sequence of operations depicted in FIG. 4. In various embodiments, operations can be omitted, combined, or divided. In some embodiments, the order of the decided operations can be changed.

Figure 5:
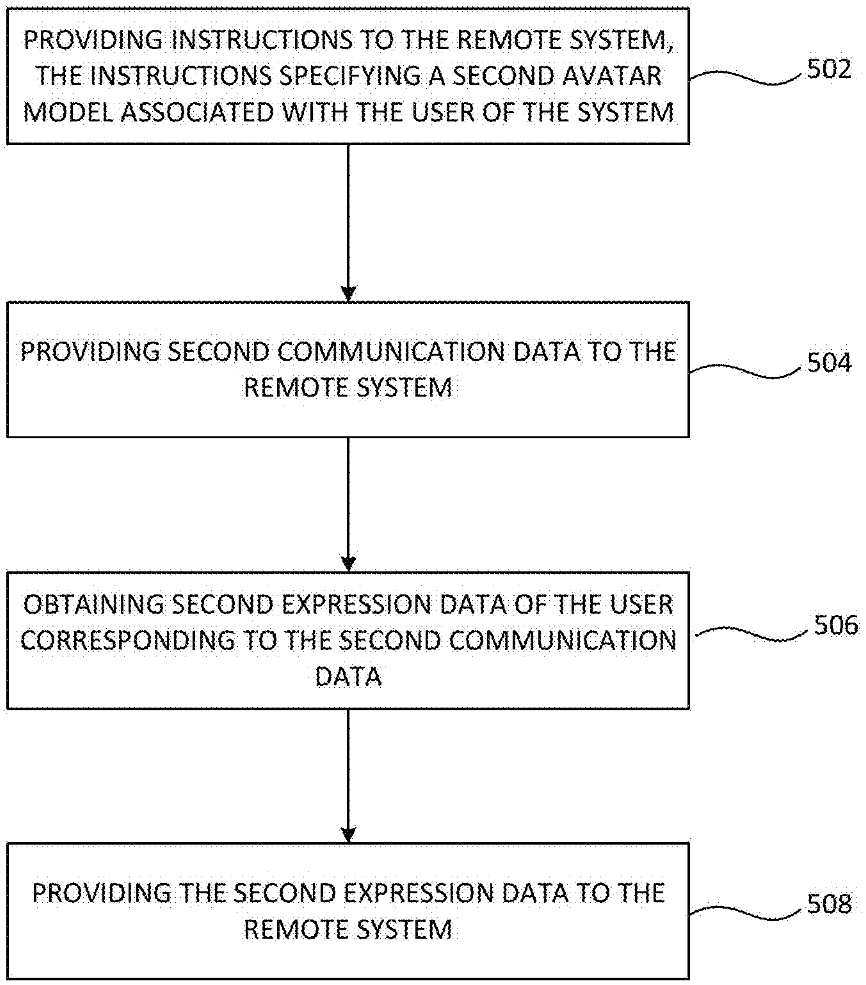
FIG. 5 illustrates an exemplary flowchart of a process for avatar communication, consistent with disclosed embodiments.

FIG. 5 illustrates an exemplary flowchart of a process 500 for avatar communication, consistent with disclosed embodiments. In some embodiments, process 500 can be performed together with process 400. For example, process 400 can describe the receipt of expression data and communication data from a remote system, while process 500 can described the generation and provision of expression data and communication data to the remote system. In some embodiments, process 500 can be performed using system 100. For convenience of description, the process is described with regard to a user device (e.g., user device 106). However, this description is not intended to be limiting.

In step 502 of process 500, the user device can provide instructions to the remote system. In some embodiments, the instructions can specify an avatar model associated with a local user of the user device. In some embodiments, the instructions can specify where the remote device can obtain an avatar model associated with a local user of the user device (e.g., an intermediary system or an avatar storage system).

As described herein, an account of a user can include or specify multiple avatar models. The different avatar models can be associated with different remote users or classes of remote users (e.g., a default avatar model, family, friends, etc.). In some embodiments, user device (or an intermediary system) can automatically select an avatar model based on the remote user. The user device (or intermediary system) can then provide instructions specifying the selected avatar model.

In some embodiments, the user device may create, select, or modify the avatar model for the local user prior to providing the instructions. In some embodiments, the user device can create, select, or modify the avatar model and then provide the avatar model to an intermediary system or register the second avatar model with the intermediary system. In some embodiments, the remote system can contact the intermediary system to obtain the avatar model (or obtain an indication of the avatar model that can be used to retrieve the avatar model). In some embodiments, the remote system can contact the user device and receive instructions to contact the intermediary system.

In some embodiments, the avatar model can be a morph target animation model, as described herein. The avatar model can include a set of morph targets corresponding to facial expressions. The expression data can specify a combination a subset of the morph targets. In some embodiments, the avatar model can be a rigged model, as described herein. The expression data can specify rig coordinates corresponding to the facial expressions.

In step 504 of process 500, the user device can provide the communication data to the remote system. Similar to step 404 of process 400, the communication data can be provided through a communication channel between the user device and the remote device. In some embodiments, the communication data can be textual. In some embodiments, the communication data can be audio data. The communication data can be acquired by the user device from the local user.

In some embodiments, even when the user device acquires video data of the user, the provided communication data can be audio data. The user device can extract this audio data from the video data. The user device can also extract the expression data from the video data. The extracted audio data and expression data can then be provided to the remote device. However, the video data is not provided to the remote device. As the video data requires far more bandwidth than the audio and expression data, providing only the audio and expression data can enable avatar communication over communication channels (or using devices) that would otherwise be incapable of supporting such communication. Alternatively, many users can communicate together simultaneously using avatar communication (e.g., in a conference call or chatroom), without requiring the bandwidth that real-time video would require.

In step 506 of process 500, the user device can obtain the expression data of the local user. This expression data can correspond to the second communication data. For example, the expression data can be extracted from image data acquired contemporaneously with the communication data. As an additional example, the expression data can be associated with the communication data.

In some embodiments, obtaining the expression data can include obtaining image data of a face of the local user. In some instances, the image data can be video data. In some embodiments, obtaining the expression data can include generating facial mesh information using the obtained image data. The expression data can then be generated from the facial mesh information. In some embodiments, obtaining the expression data can include applying the image data to a machine learning model trained to generate expression data from image data. In some embodiments, the expression data can include position, orientation and scale information for generating a pose of the second avatar model.

In step 508 of process 500, the avatar communication system may provide the expression data to the remote system. As described herein, in some embodiments, the expression data can be provided in the same communication channel as the communication data. In some embodiments, the expression data can be provided in a separate communication channel.

Figure 6:
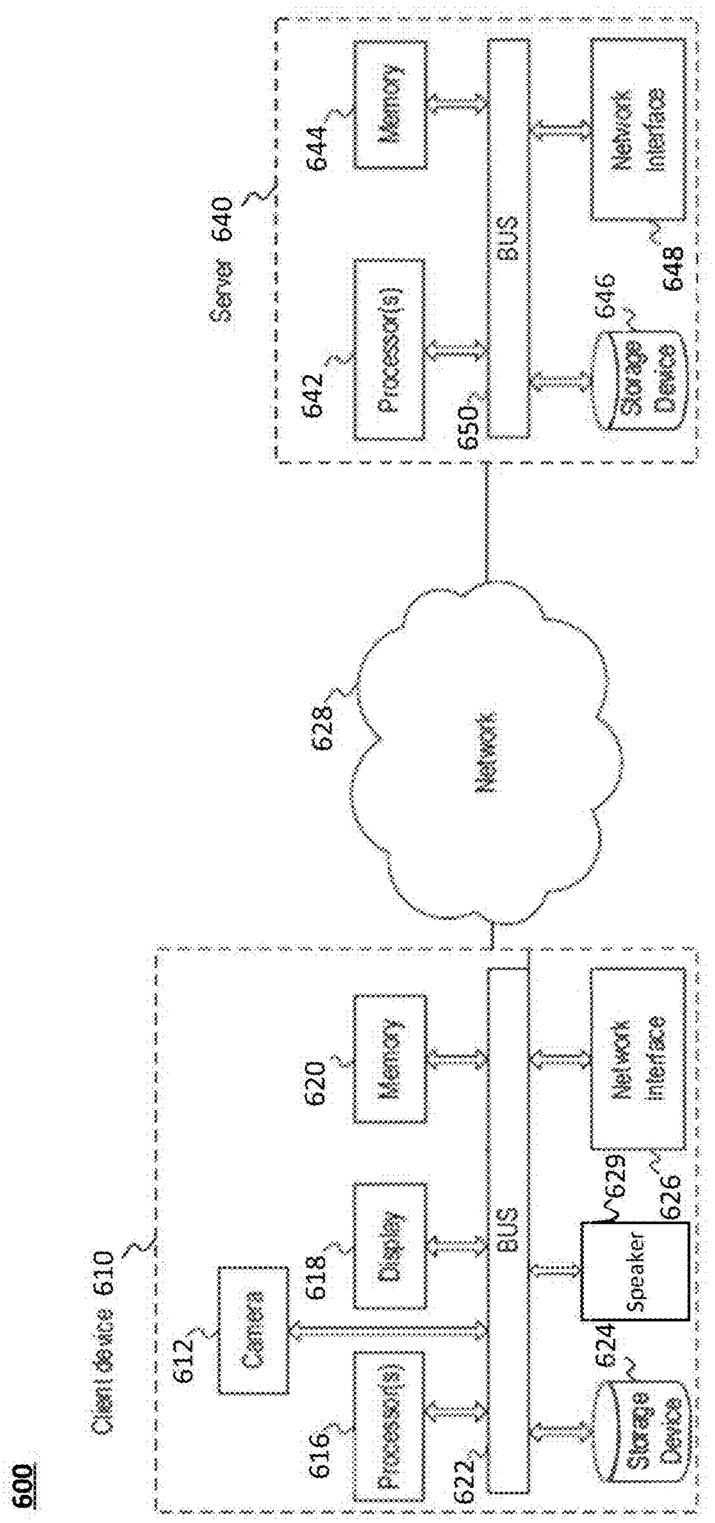
FIG. 6 depicts an exemplary system suitable for use in an avatar communication system, consistent with disclosed embodiments.

FIG. 6 depicts an exemplary system 600 suitable for use in an avatar communication system, consistent with disclosed embodiments. System 600 includes a client device 610, a server 640, and a network 628. In various embodiments, system 600 can be used to implement components of system 100. For example, intermediary system 102 can be implemented using server 640. As an additional example, user device 106 can be implemented using client device 610. In some embodiments, additional components of system 100 (e.g., game system 108, automatic response system 104, or the like) can be implemented using additional client devices or servers (not depicted in FIG. 6). In various embodiments, multiple components of system 100 can be implemented using the same components of system 600 (e.g., user device 106 and game device 108 can be implemented using client device 610, intermediary system 102 and automatic response system 104 can be implemented using server 640, or the like).

Client device 610 can include a display 618 such as a television, tablet, computer monitor, video conferencing console, IoT device, or laptop computer screen. Client device 610 can also include video/audio input devices such as a camera 612 including a video camera, web camera, or the like. Client device 610 can further include an audio output device, such as speaker 629 (e.g., a speaker, headphones, or the like). As another example, client device 610 can be or include a mobile device (e.g., a wearable device, a tablet, a smartphone, a laptop, or other mobile device having display and video/audio capture capabilities).

Client device 610 can include one or more storage devices configured to store information used by processor 616 (or other components) to perform certain functions related to the disclosed embodiments. For example, client device 610 can include memory 620 that includes instructions to enable the processor 616 to execute one or more applications for any other type of application or software known to be available on computer systems. Alternatively, or additionally, the instructions, application programs, etc. may be stored in a storage device 624 and 646 (which can also be internal to client device 610) or external storage communicatively coupled with client device 610 (not shown), such as one or more database or memory accessible over the network 628.

The processor 616 can be a central processing unit (CPU), graphical processing unit (GPU), application specific integrated circuit (ASIC) of system on a chip (SoC), field programmable gate array (FPGA), or the like. The processor 616 can comprise a single core or multiple core processors executing parallel processes simultaneously. For example, the processor 616 can be a single-core processor configured with virtual processing technologies. In certain embodiments, processor 616 can use logical processors to simultaneously execute and control multiple processes. The processor 616 can implement virtual machine technologies, or other technologies to provide the ability to execute, control, run, manipulate, store, etc. multiple software processes, applications, programs, etc. In some embodiments, the processor 616 can include a multiple-core processor arrangement (e.g., dual, quad core, etc.) configured to provide parallel processing functionalities to allow the client device 610 to execute multiple processes simultaneously. It is appreciated that other types of processor arrangements could be implemented that provide for the capabilities disclosed herein.

Client device 610 can include a bus 622 (or other communication mechanism) which interconnects subsystems and components for transferring information within the computing device. As shown, the client device 610 can include one or more processors 616, input/output ("I/O") devices 612, network interface 626 (e.g., a modem, Ethernet card, or any other interface configured to exchange data with a network), and one or more memories 620 storing programs.

The memory 620 may be a volatile or non-volatile, magnetic, semiconductor, tape, optical, removable, non-removable, or other type of storage device or tangible or non-transitory computer-readable medium that stores one or more program(s). Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory, computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

The disclosed embodiments can be further described with regard to the following clauses:

An avatar communication system, comprising: at least one processor; and at least one non-transitory, computer-readable medium containing instructions that, when executed by the at least one processor, cause the avatar communication system to perform operations, comprising: establishing an audio communication channel with a remote system; receiving first audio communication data through the audio communication channel from the remote system; receiving first expression data from the remote system, the first expression data corresponding to the received first audio communication data; obtaining a first avatar model associated with the remote system; generating an avatar image using the first expression data and the first avatar model; and displaying the avatar image and providing the first audio communication data to a user of the avatar communication system.

The system of clause 1, wherein the operations further comprise: providing second instructions to the remote system, the second instructions specifying a second avatar model associated with the user of the system; providing second audio communication data to the remote system; obtaining second expression data of the user corresponding to the second communication data; and providing the second expression data to the remote system.

The system of clause 2, wherein the operations further comprise: creating or selecting the second avatar model prior to providing the second instructions specifying the second avatar model.

The system of any one of clauses 2 to 3, wherein: the operations further comprise providing the second avatar model to an intermediary system or registering the second avatar model with the intermediary system; and the second instructions specifying the second avatar model indicate that the second avatar model is stored or registered with the intermediary system.

The system of clause 4, wherein the intermediary system comprises an avatar model storage system.

The system of any one of clauses 2 to 5, wherein obtaining second expression data of the user comprises: obtaining image data depicts a face of the user; generating facial mesh information using the obtained image data and generating the second expression data from the facial mesh information; or generating the second expression data from the image data using a machine learning model.

The system of any one of clauses 2 to 6, wherein: the second avatar model comprises a set of morph targets corresponding to expressions and the second expression data specifies a combination of ones of the set of morph targets; or the second avatar model comprises a rigged model and the second expression data specifies a set of rig coordinates corresponding to the expressions.

The system of any one of clauses 2 to 6, wherein: the second expression data includes position, orientation and scale information.

The system of any one of clauses 1 to 8, wherein establishing the audio communication channel with the remote system comprises: receiving a request to communicate with the remote system from the remote system or an intermediary system; or providing the request to communicate with the remote system to the remote system or an intermediary system.

The system of any one of clauses 1 to 9, wherein: the audio communication channel is a telephony channel; and the system and the remote system are user devices.

The system of any one of clauses 1 to 9, wherein: the audio communication channel connects to an automated voice system or chatbot running on the remote system.

The system of any one of clauses 1 to 11, wherein obtaining the first avatar model comprises: receiving an identifier of the first avatar model from the remote system or an intermediary system; and retrieving the first avatar model, using the identifier, from a memory accessible to the system.

The system of any one of clauses 1 to 11, wherein obtaining the first avatar model comprises: receiving the first avatar model from the remote system or an intermediary system.

The system of any one of clauses 1 to 13, wherein the first avatar model is obtained: before the establishing of the audio communication channel; or during the existence of the audio communication channel.

The system of any one of clauses 1 to 11, wherein obtaining the first avatar model comprises: receiving an initial avatar model and subsequently receiving the first avatar model, a size of the initial avatar model being smaller than a size of the first avatar model.

The system of any one of clauses 1 to 15, wherein the first expression data is received through the audio communication channel.

The system of one of clauses 1 to 15, wherein the audio communication channel comprises a stream of audio packets and the first expression data is included into control fields of the audio packets.

The system of one of clauses 1 to 15, wherein the first expression data is received through another communication channel separate from the audio communication channel.

The system of one of clauses 1 to 18, wherein: the first avatar model includes a set of morph targets and a morph target mapping from the first expression data to morph target weights for combining or interpolating between ones of the morph targets; or the first avatar model includes a rigged model and a rigging mapping from the first expression data to sets of rig coordinates.

The system of one of clauses 1 to 18, wherein the avatar image is generated using morph target animation or rigging animation.

A server, comprising: at least one processor; and at least one non-transitory, computer-readable medium containing instructions that, when executed by the at least one processor, cause the server to perform operations, comprising: receiving, from a first device of a first user, second instructions specifying an avatar model for the first user; receiving, from the first device of the first user, expression data for the first user, the expression data generated by the device from an image of the first user; generating an avatar image representing the first user using the avatar model and the expression data; receiving, from the first device of the first user, audio communication data for the user, the audio communication data corresponding to the expression data; and providing third instructions to display the avatar image and provide the audio communication data to a second device of a second user.

The server of clause 21, wherein: the operations further comprise creating a virtual conference room; receiving, from the second device, an indication that the second user is attempting to access the virtual conference room; and establishing, in response to receipt of the indications, communication channels with the second devices.

The server of clause 21, wherein: providing third instructions to display the avatar image comprises providing fourth instructions to display the avatar image in a graphical user interface of a multiplayer game or a graphical user interface of a virtual conference room.

The server of clause 23, wherein: the first device and the second device are game devices; the graphical user interface is a graphical user interface of a multiplayer game; and displaying the avatar image in the graphical user interface of the multiplayer game comprises rendering the avatar's image within a scene of the multiplayer game or a chat window of the multiplayer game.

The server of clause 24, wherein: providing third instructions to display the avatar image and provide the audio communication data to the second device comprises providing the third instructions to a game server independent of the application server.

The server of any one of clauses 21 to 25, wherein: the second instructions identify an avatar storage system and an identifier for the avatar model; and the operations further comprise retrieving the avatar model from the avatar storage system using the second instructions received from the first device.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An avatar communication method, comprising:
- establishing an audio communication channel with a remote system, wherein audio packets are communicated through the audio communication channel;
- receiving first audio communication data through the audio communication channel from the remote system;
- receiving first expression data from the remote system, the first expression data including position, orientation, and scale information, corresponding to the received first audio communication data, and included into control fields of the audio packets;
- obtaining a first avatar model associated with the remote system;
- generating an avatar image using the first expression data and the first avatar model; and
- displaying the avatar image and providing the first audio communication data to a user.

2. The method of claim 1, further comprising:
- providing second instructions to the remote system, the second instructions specifying a second avatar model associated with the user of the system;
- providing second audio communication data to the remote system;
- obtaining second expression data of the user corresponding to the second audio communication data; and
- providing the second expression data to the remote system.

3. The method of claim 1, wherein:
- the first avatar model comprises a set of morph targets corresponding to expressions and the first expression data specifies a combination of ones of the set of morph targets; or
- the first avatar model comprises a rigged model and the first expression data specifies a set of rig coordinates corresponding to the expressions.

4. An avatar communication system, comprising:
- at least one processor; and
- at least one non-transitory, computer-readable medium containing instructions that, when executed by the at least one processor, cause the avatar communication system to perform operations, comprising:
  - establishing an audio communication channel with a remote system, wherein audio packets are communicated through the audio communication channel;
  - receiving first audio communication data through the audio communication channel from the remote system;
  - receiving first expression data from the remote system, the first expression data including position, orientation, and scale information, corresponding to the received first audio communication data, and included into control fields of the audio packets;
  - obtaining a first avatar model associated with the remote system;
  - generating an avatar image using the first expression data and the first avatar model; and
  - displaying the avatar image and providing the first audio communication data to a user of the avatar communication system.

5. The system of claim 4, wherein the operations further comprise:
- providing second instructions to the remote system, the second instructions specifying a second avatar model associated with the user of the system;
- providing second audio communication data to the remote system;
- obtaining second expression data of the user corresponding to the second audio communication data; and
- providing the second expression data to the remote system.

6. The system of claim 5, wherein the operations further comprise:
- creating or selecting the second avatar model prior to providing the second instructions specifying the second avatar model.

7. The system of claim 5, wherein:
- the operations further comprise providing the second avatar model to an intermediary system or registering the second avatar model with the intermediary system; and
- the second instructions specifying the second avatar model indicate that the second avatar model is stored or registered with the intermediary system.

8. The system of claim 5, wherein obtaining the second expression data of the user comprises:
- obtaining image data depicting a face of the user; and either
- generating facial mesh information using the obtained image data and generating the second expression data from the facial mesh information; or
- generating the second expression data from the image data using a machine learning model.

9. The system of claim 5, wherein:
- the second avatar model comprises a set of morph targets corresponding to expressions and the second expression data specifies a combination of ones of the set of morph targets; or
- the second avatar model comprises a rigged model and the second expression data specifies a set of rig coordinates corresponding to the expressions.

10. The system of claim 5, wherein:
- the second expression data includes position, orientation and scale information.

11. The system of claim 4, wherein establishing the audio communication channel with the remote system comprises:
- receiving a request to communicate with the remote system from the remote system or an intermediary system; or providing the request to communicate with the remote system to the remote system or the intermediary system.

12. The system of claim 4, wherein:

the audio communication channel connects to an automated voice system or chatbot running on the remote system.

13. The system of claim 4, wherein obtaining the first avatar model comprises:

receiving an identifier of the first avatar model from the remote system or an intermediary system; and retrieving the first avatar model, using the identifier, from a memory accessible to the system.

14. The system of claim 4, wherein obtaining the first avatar model comprises:

receiving an initial avatar model and subsequently receiving the first avatar model, a size of the initial avatar model being smaller than a size of the first avatar model.

15. The system of claim 4, wherein:

the first avatar model includes a set of morph targets and a morph target mapping from the first expression data to morph target weights for combining or interpolating between ones of the morph targets; or the first avatar model includes a rigged model and a rigging mapping from the first expression data to sets of rig coordinates.

16. The system of claim 4, wherein the avatar image is generated using morph target animation or rigging animation.

17. A non-transitory, computer-readable medium containing instructions that, when executed by at least one processor of an avatar communication system, cause the avatar communication system to perform operations, comprising:

establishing an audio communication channel with a remote system, wherein audio packets are communicated through the audio communication channel;

receiving first audio communication data through the audio communication channel from the remote system;

receiving first expression data from the remote system, the first expression data including position, orientation, and scale information, corresponding to the received first audio communication data, and included into control fields of the audio packets;

obtaining a first avatar model associated with the remote system;

generating an avatar image using the first expression data and the first avatar model; and displaying the avatar image and providing the first audio communication data to a user of the avatar communication system.

18. The non-transitory, computer-readable medium of claim 17, wherein the operations further comprise:

providing second instructions to the remote system, the second instructions specifying a second avatar model associated with the user of the system;

providing second audio communication data to the remote system;

obtaining second expression data of the user corresponding to the second audio communication data; and providing the second expression data to the remote system.

19. The non-transitory, computer-readable medium of claim 17, wherein:

the first avatar model comprises a set of morph targets corresponding to expressions and the first expression data specifies a combination of ones of the set of morph targets; or the first avatar model comprises a rigged model and the first expression data specifies a set of rig coordinates corresponding to the expressions.

* * * * *